US007917942B2

(12) United States Patent
Costa-Requena et al.

(10) Patent No.: US 7,917,942 B2
(45) Date of Patent: Mar. 29, 2011

(54) SYSTEM AND METHOD FOR CONFIGURING SECURITY IN A PLUG-AND-PLAY ARCHITECTURE

(75) Inventors: Jose Costa-Requena, Helsinki (FI); Inmaculada Espigares, Helsinki (FI)

(73) Assignee: Nokia Corporation, Espoo (FI)

( * ) Notice: Subject to any disclaimer, the term of this patent is extended or adjusted under 35 U.S.C. 154(b) by 995 days.

(21) Appl. No.: 11/362,552

(22) Filed: Feb. 24, 2006

(65) Prior Publication Data

US 2007/0208948 A1    Sep. 6, 2007

(51) Int. Cl.
G06F 7/04 (2006.01)
G06F 15/16 (2006.01)
G06F 17/30 (2006.01)
H04L 29/06 (2006.01)

(52) U.S. Cl. ....... 726/4; 726/2; 726/3; 726/20; 713/153; 713/155; 713/185; 709/224; 709/225

(58) Field of Classification Search .................. 726/4, 2, 726/27; 713/169, 192, 194; 710/313
See application file for complete search history.

(56) References Cited

U.S. PATENT DOCUMENTS

| 7,240,369 B2 * | 7/2007 | Chou et al. ....................... 726/27 |
| 7,540,024 B2 * | 5/2009 | Phillips et al. .................... 726/20 |
| 7,600,113 B2 * | 10/2009 | Kuehnel et al. ............... 713/155 |
| 2005/0235048 A1 | 10/2005 | Costa-Requena et al. |
| 2005/0240758 A1 * | 10/2005 | Lord et al. .................... 713/153 |
| 2005/0266826 A1 | 12/2005 | Vlad |
| 2006/0080726 A1 * | 4/2006 | Bodlaender et al. ............... 726/2 |

OTHER PUBLICATIONS

Carl M. Ellison; Home Network Security—Interoperable Home Infrastructure; Intel® Technology Journal; Nov. 2002; pp. 37-48; vol. 06, Issue 04; ISSN 1535-766X.
DeviceSecurity: 1 Service Template—For UPnP™ Device Architecture 1.0; Nov. 2003; 66 pages; Contributing Members of the UPnP™ Forum; UPnP™ Implementers Corporation.
UPnP™ Security Ceremonies Design Document; Oct. 2003; 18 Pages; UPnP Security Ceremonies Version 1.0; Contributing Members of the UPnP™ Forum; UPnP™ Implementers Corporation.
Understanding Universal Plug and Play—White Paper; 2000; 23 pages (condensed); Microsoft® Windows® Me Millennium Edition—Operating System; Microsoft Corporation.
RemoteUIClientDevice: 1 Device Template Version 1.01—for UPnP™ Version 1.0; Standardized DCP; Sep. 2, 2004; 11 pages; Contributing Members of the UPNP™ Forum.

(Continued)

Primary Examiner — Taghi T Arani
Assistant Examiner — Narciso Victoria
(74) Attorney, Agent, or Firm — Alston & Bird LLP

(57) ABSTRACT

A plug-and-play (PnP) for configuring security in a PnP architecture includes a security manager and a PnP device. The PnP device is adapted to send a device description document to a user entity. The device description document includes an address pointing to the security manager, and as such, the user entity is capable of accessing the security manager based upon the address. The security manager is adapted to authenticate the user entity, and it authenticated, to communicate with the user entity to configure application-layer security of the PnP device, whereby configuring the application-layer security includes creating an access control list (ACL) document for restricting access to a service of the PnP device. In a further aspect, the PnP device may bootstrap establishing its link-layer security with configuring its application-layer security.

48 Claims, 5 Drawing Sheets

OTHER PUBLICATIONS

*RemoteUIClient: 1 Service Template Version 1.01—For UPnP™ Version 1.0*—Standardized DCP; Sep. 2, 2004; 29 pages; Contributing Members of the UPnP™ Forum.

*RemoteUIServer Device: 1 Device Template Version 1.01—For UPnP™ Version 1.0*—Standardized DCP; Sep. 2, 2004; 11 pages; Contributing Members of the UPnP™ Forum.

*RemoteUIServer: 1 Service Template Version 1.01—For UPnP™ Version 1.0*—Standardized DCP; Sep. 2, 2004; 20 pages; Contributing Members of the UPnP™ Forum.

*Open Mobile Alliance—Digital Rights Management—Short Paper*; Open Mobile Alliance; Dec. 2003; 8 pages; Open Mobile Alliance Ltd.

* cited by examiner

SYSTEM AND METHOD FOR CONFIGURING SECURITY IN A PLUG-AND-PLAY ARCHITECTURE

FIELD OF THE INVENTION

The present invention generally relates to configuring application-layer security for an entity and, more particularly, relates to configuring application-layer security for an entity in a plug-and-play architecture.

BACKGROUND OF THE INVENTION

Architectures such as that provided by Universal Plug and Play (UPnP™) define architectures for the network connectivity of intelligent appliances, wireless devices, and PCs of all form factors. The goal of UPnP™ technology is to provide easy-to-use, flexible, standards-based connectivity for ad-hoc or unmanaged networks whether in a home, in a small business, or in public spaces. In support of this goal, UPnP™ supports zero-configuration, "invisible" networking, and the automatic discovery of devices from a wide range of manufacturers. As a result, a device can dynamically join a network, obtain an IP address, convey its capabilities to the network, and determine the presence and capabilities of other devices.

UPnP™ is more particularly an open networking architecture that consists of services, devices, and control points. Control points are essentially software applications and are the active components of the UPnP™ architecture. Devices are physical or logical entities, enumerated via simple eXtensible Markup Language (XML) descriptions and containing Application Programming Interfaces (APIs) referred to as services. Physical devices may host multiple logical devices, and each device may host multiple services. Services are groups of states and actions. For example, a light switch has an "on" state and an "off" state. An action allows the network to determine the state of the switch or to change the state of the switch. Services typically reside in devices.

One of the primary concerns with emerging connectivity architectures is that of security. In this regard, the basic UPnP™ protocol does not include security. One of the message formats supported by UPnP™, the Simple Service Discovery Protocol (SSDP), provides for the discovery of devices on the network and is difficult to secure. Another supported message format, the General Event Notification Architecture (GENA), provides for subscribing to event reports and for the publication of those events. GENA is secured by controlling subscription to events and encrypting the events. A further supported message format, the Simple Object Access Protocol (SOAP), provides for control of the network devices through remote procedure calls between control points and devices. SOAP is secured by allowing only authorized control points to invoke any secured action within a device. In brief, SOAP is secured by allowing only authorized control points to invoke any secured action within a device. This is accomplished by an Access Control List (ACL) in each secured device, each of the entries of which lists a control point unique ID, a name of a group of control points, or the universal group "<any/>." The ACL entries also specify what that control point or group is allowed to do on that device.

The UPnP™ architecture includes a Device Security Service that provides the services necessary for strong authentication, authorization, replay prevention, and privacy of UPnP™ SOAP actions. Under this architecture, a device enforces its own access control, but its access control policy is established and maintained by an administrative application called a Security Console. The UPnP™ Security Console Service edits the ACL of a secured UPnP™ device and controls other security functions of that device. Thus, UPnP™ Security is provided by a pair of services, Device Security and Security Console. Device Security implements access control for itself and for other services in the same device. A primary function of the Security Console is to enable a user to select from physically accessible devices and control points external to the device.

The Security Console is a combination of a device and control point that can be a separate component or part of some other component. Its purpose is to take security ownership of devices and then to authorize control points (or other Security Consoles) to have access to devices over which the Security Console has control. A control point does not need to be exclusive about which Security Console it advertises itself to. The control point is the beneficiary of grants of authority and all decision making is done by the Security Console. The situation, however, is reversed for devices. A device has the resources (SOAP Actions) to which access must be restricted. The Security Console, by editing the device's ACL, tells the device which control points to obey. Therefore, the device should be very selective in determining to which Security Console the device associates.

Based on the generic ownership protocol defined by UPnP™ Security, the Security Console can take ownership of a device only if the Security Console knows the device's secret password and the device is not already owned. Once a device is owned, a Security Console that owns it can grant co-ownership to another Security Console or revoke it, but more importantly, a Security Console that owns a device can completely re-write the device's ACL.

Although UPnP™ Security provides adequate security for supported devices, it is always desirable to improve upon existing techniques.

SUMMARY OF THE INVENTION

In light of the foregoing background, exemplary embodiments of the present invention provide an improved user entity, plug-and-play (PnP) entity, method, and computer program product for configuring security in a PnP architecture. In accordance with exemplary embodiments of the present invention, the device description document of a device in a PnP architecture may include a security address pointing to a security manager. A control point receiving the device description document, then, can access the security manager via the security address, and configure application-layer security of the device via the security manager, such as by configuring an access control list (ACL) of the device. Thus, although the control point may be triggered to configure the application-layer security via the device description document of the PnP device, the control point may configure the application-layer security without regard to any security service (e.g., PnP Device Security Service) that may otherwise be provided by the PnP architecture.

In a further aspect of exemplary embodiments of the present invention, a device in a PnP architecture may bootstrap establishing its link-layer security with configuring its application-layer security. In this regard, establishing link-layer security of the device may include acquisition of various parameters, including various cryptographic keys. These parameters, then, may also be used by the device during configuration of the application-layer security of the device, such as by authenticating an owner of the device. Thus, configuring application-layer security in these instances may occur without the overhead and time required to separately exchange parameters for use during configuration.

According to one aspect of exemplary embodiments of the present invention, a PnP entity is provided for configuring security in a PnP architecture. The PnP entity includes a security manager and a PnP device. The PnP device is adapted to send a device description document to a user entity. The device description document includes an address pointing to the security manager, and as such, the user entity is capable of accessing the security manager based upon the address. The user entity is capable of accessing the security manager based upon the address (e.g., URL) received in the device description using a non-PnP standard or protocol (e.g. HTTP, XCAP, WebDAV, etc). The security manager is adapted to authenticate the user entity, and if authenticated, to communicate with the user entity to configure application-layer security of the PnP device, whereby configuring the application-layer security includes creating an access control list (ACL) document for restricting access to a service of the PnP device. In this regard, the ACL may be maintained independent of a security service provided by the PnP architecture (e.g., a non-UPnP Device Security Service ACL), or may be maintained in accordance with such a security service (e.g., an UPnP PnP Device Security Service ACL). Maintaining the ACL independent of a PnP security service may permit a legacy control point that are not aware of a PnP security service to interact with PnP entities that implement PnP security specifications.

More particularly, for example, the security manager may be adapted to communicate with the user entity by sending a page document to the user entity, where the page document may be configured in accordance with a non-PnP standard (e.g., HTTP, XCAP, WebDAV, etc.). The page document can be sent such that the user entity is capable of receiving information into the page document, where the information identifies one or more users authorized to access a service of the PnP device. The security manager may then receive the page document including the entered information, and post the entered information in the ACL document of the PnP device.

The device description document sent by the PnP device may be configured in accordance with a PnP standard. In such instances, for example, the PnP device may be adapted to send the device description document after multicasting a device announcement to one or more user entities. The PnP device may then be adapted to send the device description document in response to a request from the user entity, the request being sent from the user entity in response to the device announcement.

In accordance with a further aspect of exemplary embodiments of the present invention, the PnP entity includes a PnP device adapted to receive network parameters from a user entity, where the user entity has a link-layer security association with a network, the security association being at least partially defined by the network parameters. The PnP device is adapted to establish link-layer security of the PnP device with the network. In this regard, establishing link-layer security includes the PnP device establishing a security association of the PnP device with the network, whereby establishing the security association includes the PnP device sending the received network parameters to the network. To configure application-layer security of the PnP device, the PnP device is further adapted to receive a request to effectuate a take-ownership action of the user entity, and to authenticate the user entity based upon the request and the received network parameters. And if the user entity is authenticated, the PnP device is adapted to communicate with the user entity to configure application-layer security of the PnP device, whereby configuring the application-layer security includes creating an ACL document for the PnP device.

The security association of the user entity with the network may denote a secure link between the user entity and the network, and the security association of the PnP device with the network may denote a secure link between the PnP device and the network. Thus, the PnP entity may be adapted to receive the request from the secure link between the user entity and the network, and the secure link between the network and the PnP device. Further, the request received by the PnP device may include a password or personal identification number, and may be received without a signature of the user entity, and without encryption of the included password or personal identification number.

According to other aspects of the present invention, a user entity, method and computer program product are provided for configuring security in a PnP architecture. Exemplary embodiments of the present invention therefore provide an improved user entity, PnP entity, method, and computer program product for configuring security in a PnP architecture. As indicated above, and explained below, exemplary embodiments of the present invention enable a user entity to be triggered to configure the application-layer security via a device description document in the PnP architecture, but actually configure the application-layer security without regard to any security service that may otherwise be provided by the PnP architecture. Further, exemplary embodiments of the present invention permit bootstrapping establishing link-layer security with configuring application-layer security, thereby reducing the overhead and time required to separately establish or configure both security measures. As such, user entity, PnP entity, method, and computer program product of exemplary embodiments of the present invention solve the problems identified by prior techniques and provide additional advantages.

BRIEF DESCRIPTION OF THE DRAWINGS

Figure 1:
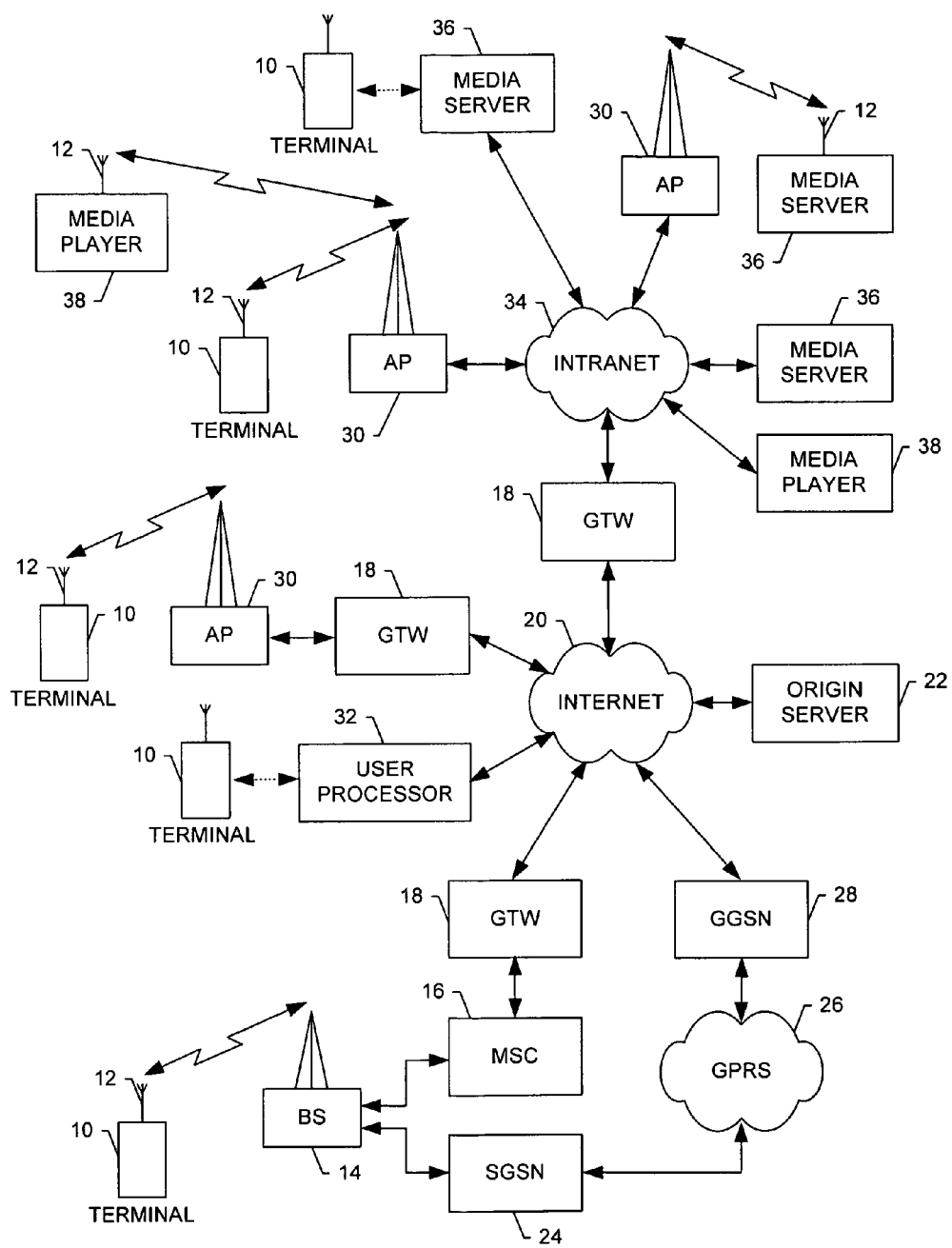
Figure 2:
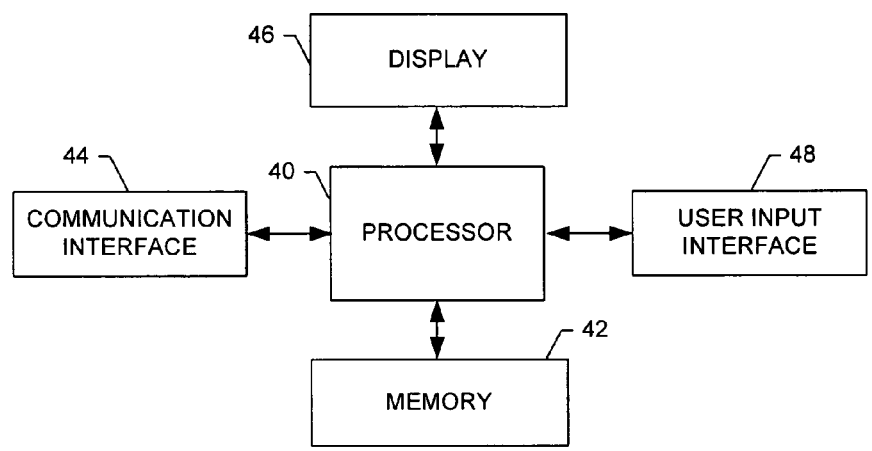
Figure 3:
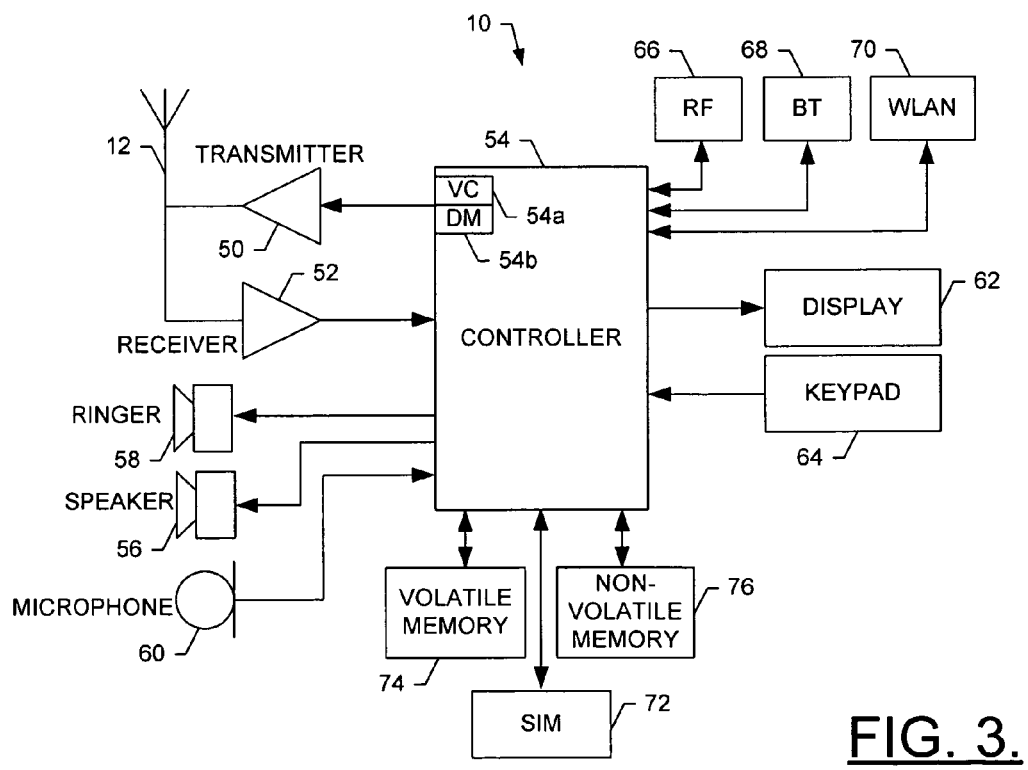
Figure 4:
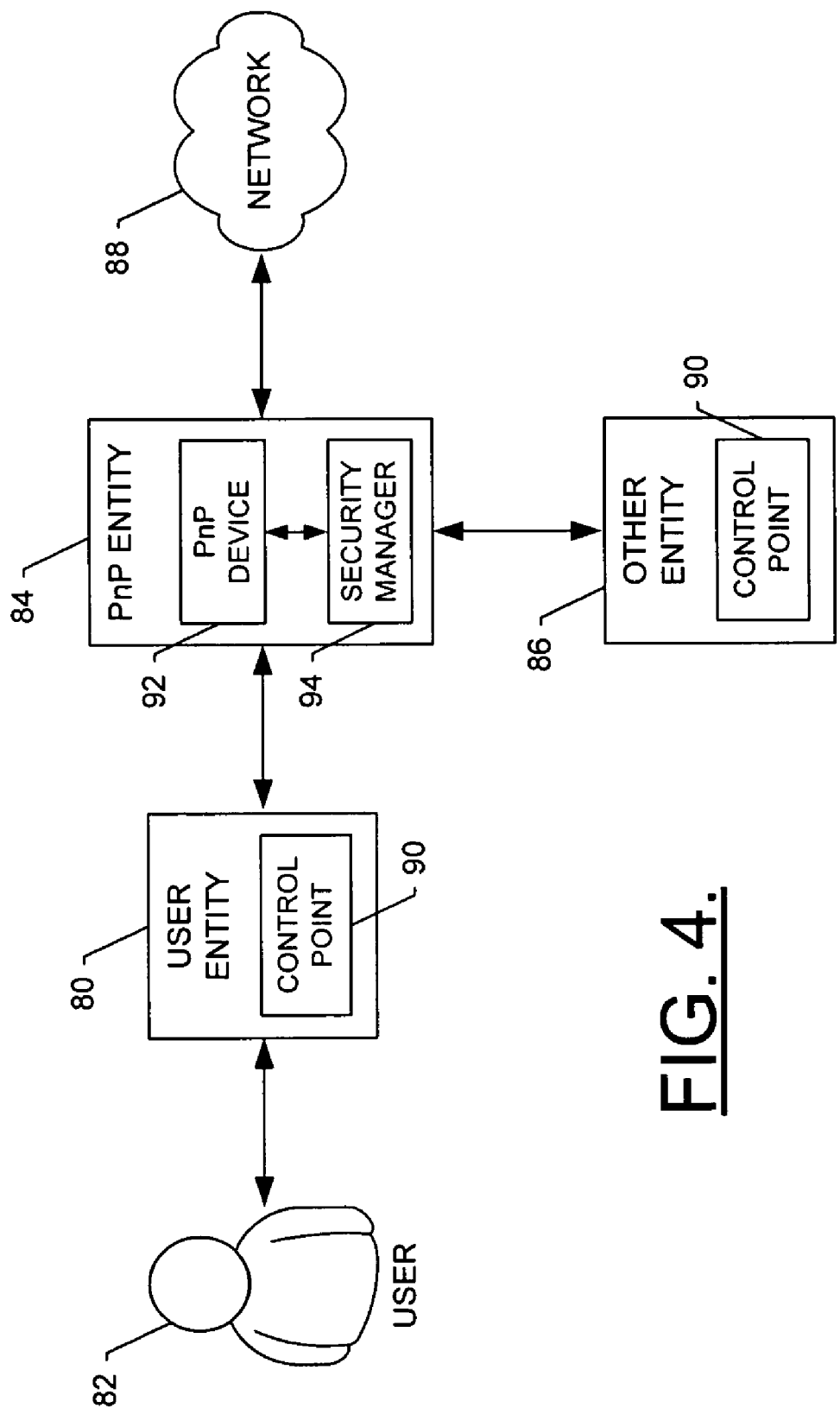
Figure 5:
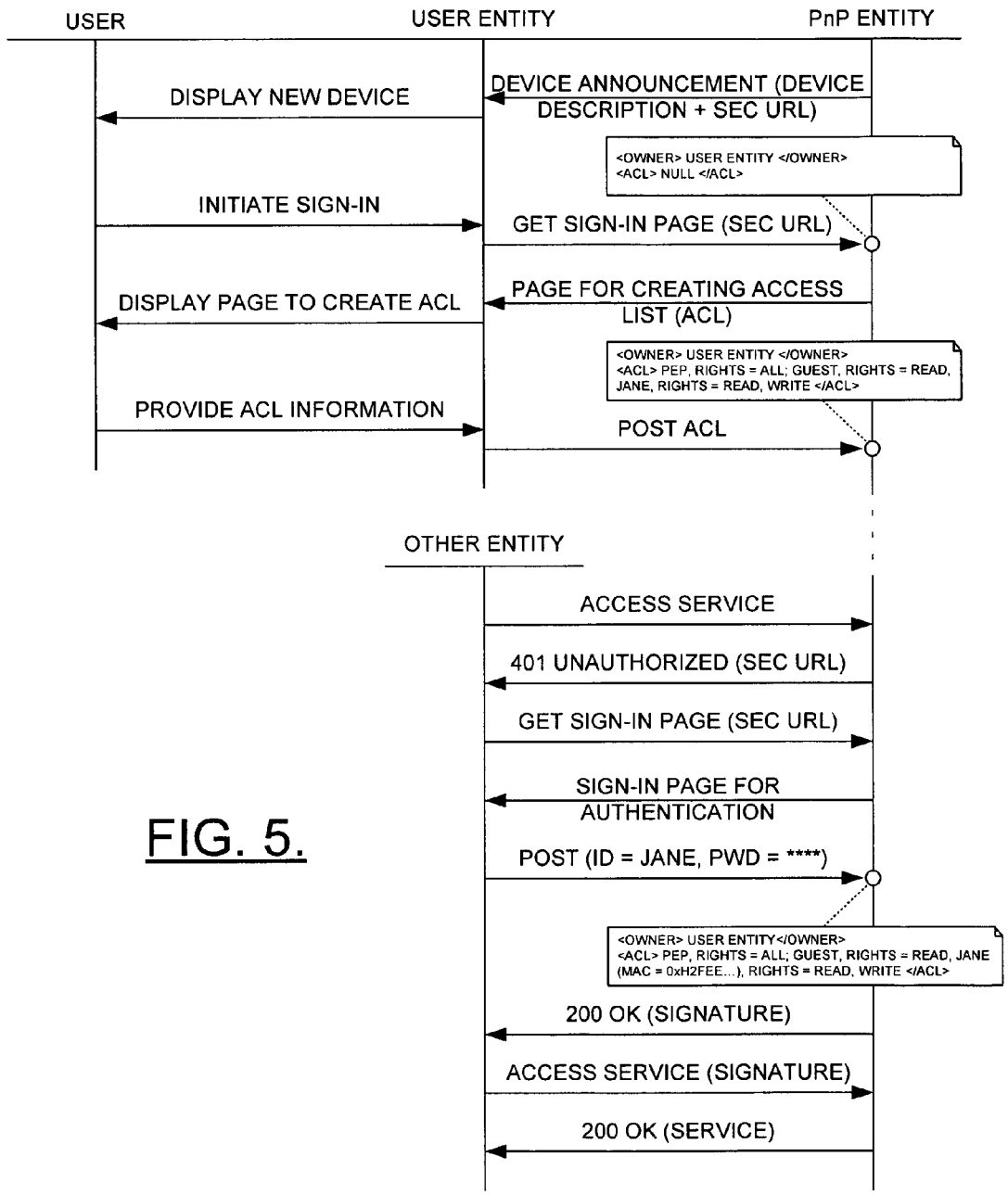
Figure 6:
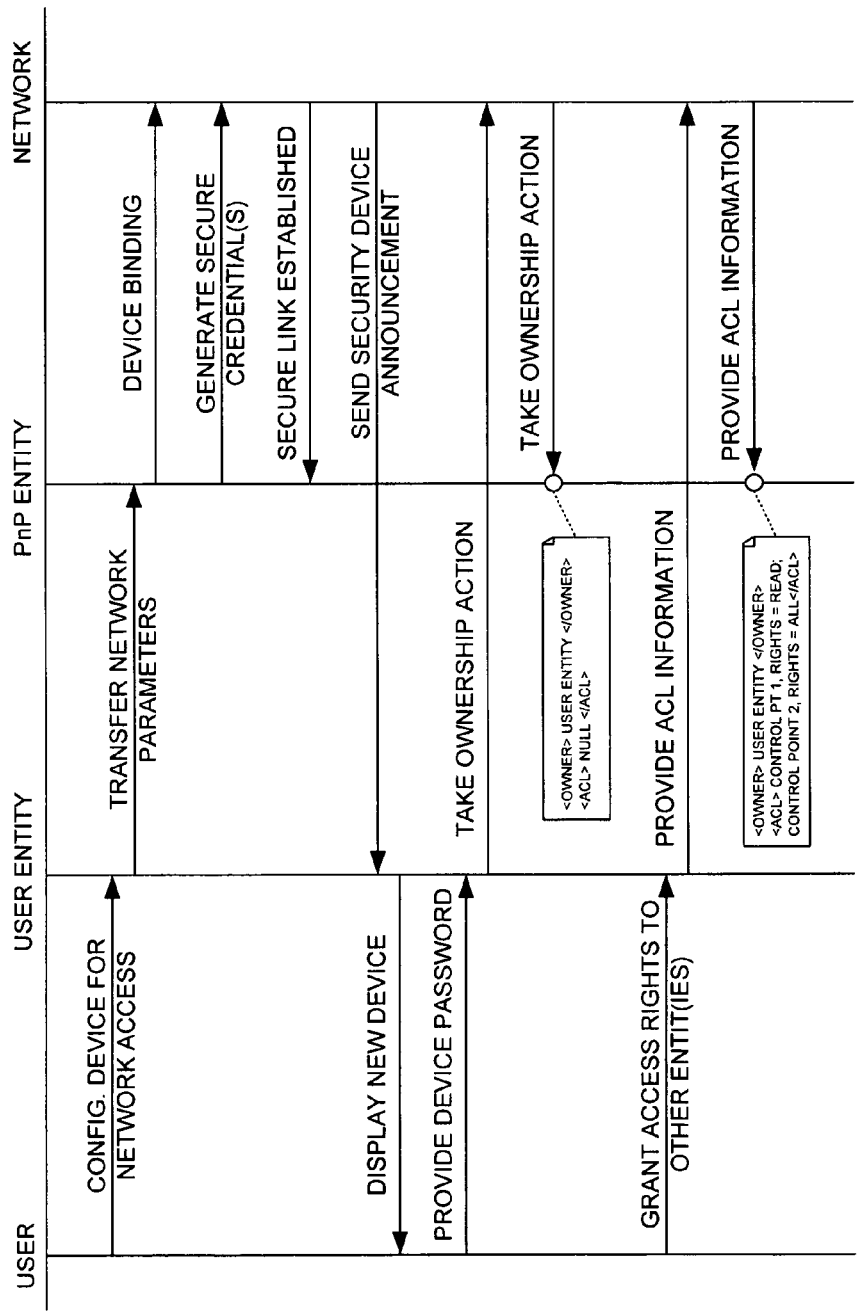

Having thus described the invention in general terms, reference will now be made to the accompanying drawings, which are not necessarily drawn to scale, and wherein:

FIG. 1 is a block diagram of a system for configuring security in a plug-and-play architecture, in accordance with to one exemplary embodiment of the present invention;

FIG. 2 is a block diagram of an entity capable of operating as one or more elements of the system of FIG. 1, in accordance with exemplary embodiments of the present invention;

FIG. 3 is a schematic block diagram of a mobile terminal, in accordance with one exemplary embodiment of the present invention;

FIG. 4 is a functional block diagram of a user entity, under control of a user, configuring application-layer security of a plug-and-play entity such as to permit another entity to access a resource of the plug-and-play entity and/or in connection with configuring link-layer security of the plug-and-play entity accessing a network, in accordance with exemplary embodiments of the present invention;

FIG. 5 is a control flow diagram illustrating various steps in a method of configuring application-layer security of a plug-and-play entity to permit another entity to access a resource of the plug-and-play entity, in accordance with one exemplary embodiment of the present invention; and FIG. 6 is a control flow diagram illustrating various steps in a method of configuring application-layer security of a plug-and-play entity in connection with configuring link-layer security of the plug-and-play entity accessing a network, in accordance with one exemplary embodiment of the present invention.

DETAILED DESCRIPTION OF THE INVENTION

The present invention now will be described more fully hereinafter with reference to the accompanying drawings, in which preferred exemplary embodiments of the invention are shown. This invention may, however, be embodied in many different forms and should not be construed as limited to the exemplary embodiments set forth herein; rather, these exemplary embodiments are provided so that this disclosure will be thorough and complete, and will fully convey the scope of the invention to those skilled in the art. Like numbers refer to like elements throughout.

Referring to FIG. 1, an illustration of one type of terminal and system that would benefit from the present invention is provided. The system, method and computer program product of exemplary embodiments of the present invention will be primarily described in conjunction with mobile communications applications. It should be understood, however, that the system, method and computer program product of exemplary embodiments of the present invention can be utilized in conjunction with a variety of other applications, both in the mobile communications industries and outside of the mobile communications industries. For example, the system, method and computer program product of exemplary embodiments of the present invention can be utilized in conjunction with wireline and/or wireless network (e.g., Internet) applications.

As shown, a terminal 10 may include an antenna 12 for transmitting signals to and for receiving signals from a base site or base station (BS) 14. The base station is a part of one or more cellular or mobile networks that each include elements required to operate the network, such as a mobile switching center (MSC) 16. The mobile network may also be referred to as a Base Station/MSC/Interworking function (BMI). In operation, the MSC is capable of routing calls to and from the terminal when the terminal is making and receiving calls. The MSC can also provide a connection to landline trunks such as, for example, when the terminal is involved in a call. In addition, the MSC can be capable of controlling the forwarding of messages to and from the terminal, and can also controlling the forwarding of messages for the terminal to and from a messaging center, such as short messaging service (SMS) messages to and from a SMS center (SMSC) (not shown).

The MSC 16 can be coupled to a data network, such as a personal area network (PAN), a local area network (LAN), a metropolitan area network (MAN), and/or a wide area network (WAN). The MSC can be directly coupled to the data network. In one typical exemplary embodiment, however, the MSC is coupled to a GTW 18, and the GTW is coupled to a WAN, such as the Internet 20. In turn, devices such as processing elements (e.g., personal computers, server computers or the like) can be coupled to the terminal 10 via the Internet. For example, the processing elements can include one or more processing elements associated with one or more rights issuers 22 and/or content providers 23, one of each being shown in FIG. 1.

The BS 14 can also be coupled to a signaling GPRS (General Packet Radio Service) support node (SGSN) 24. The SGSN is typically capable of performing functions similar to the MSC 16 for packet-switched services. The SGSN, like the MSC, can be coupled to a data network, such as the Internet 20. The SGSN can be directly coupled to the data network. In a more typical exemplary embodiment, however, the SGSN is coupled to a packet-switched core network, such as a GPRS core network 26. The packet-switched core network is then coupled to another GTW, such as a GTW GPRS support node (GGSN) 28, and the GGSN is coupled to the Internet. Also, the GGSN can be coupled to a messaging center, such as a multimedia messaging service (MMS) center (not shown). In this regard, the GGSN and the SGSN, like the MSC, can be capable of controlling the forwarding of messages, such as MMS messages. The GGSN and SGSN can also be capable of controlling the forwarding of messages for the terminal to and from the messaging center. In addition, by coupling the SGSN 24 to the GPRS core network 26 and the GGSN 28, processing elements such as one or more origin servers 22 can be coupled to the terminal 10 via the Internet 20, SGSN and GGSN. In this regard, devices such as origin server(s) can communicate with the terminal across the SGSN, GPRS and GGSN.

Although not every element of every possible mobile network is shown and described herein, it should be appreciated that the terminal 10 can be coupled to one or more of any of a number of different networks through the BS 14. In this regard, the network(s) can be capable of supporting communication in accordance with any one or more of a number of first-generation (1G), second-generation (2G), 2.5G and/or third-generation (3G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from exemplary embodiments of the present invention, as should dual or higher mode terminals (e.g., digital/analog or TDMA/CDMA/analog phones).

The terminal 10 can further be coupled to one or more wireless access points (APs) 30. The APs can comprise access points configured to communicate with the terminal in accordance with techniques such as, for example, radio frequency (RF), Bluetooth (BT), infrared (IrDA) or any of a number of different wireless networking techniques, including WLAN techniques as shown in FIG. 1. Additionally, or alternatively, the terminal can be coupled to one or more user processors 32. Each user processor can comprise a computing system such as a personal computer, laptop computer or the like. In this regard, the user processors can be configured to communicate with the terminal in accordance with techniques such as, for example, RF, BT, IrDA or any of a number of different wireline or wireless communication techniques, including LAN and/or WLAN techniques. One or more of the user processors can additionally, or alternatively, include a removable memory capable of storing content, which can thereafter be transferred to the terminal.

The APs 30 and the user processors 32 may be coupled to the Internet 20. Like with the MSC 16, the APs and user processors can be directly coupled to the Internet. In one exemplary embodiment, however, the APs are indirectly coupled to the Internet via a GTW 18. As will be appreciated, by directly or indirectly connecting the terminals 10, origin server(s) 22, as well as any of a number of other devices, processors or the like, to the Internet, the terminals can communicate with one another, the rights issuer(s), content provider(s), etc., to thereby carry out various functions of the terminal, such as to transmit data, content or the like to, and/or receive content, data or the like from, the service providers and/or authorization managers.

In accordance with exemplary embodiments of the present invention, the Internet 20, and thus the terminal 10, can be coupled to one or more intranets. Each intranet can comprise one or more interlinked LANs, as well as portions of one or more PANs, LANs, MANs, WANs or the like. As shown in FIG. 1, at least one intranet 34 generally comprises a private network contained within a home, such as in accordance with the Digital Living Network Alliance (DLNA) architecture and/or the UPnP™ (Universal Plug and Play) architecture. As with the Internet, the intranet can be coupled to devices such as processing elements which, in turn, can be coupled to the Internet and terminal via the intranet. In addition, the intranet can be coupled to one or more APs 30 capable of coupling processing elements, terminals and other devices to the intranet. Within the intranet, the entities can be configured to communicate with one another in a number of different manners, such as in accordance with the UPnP™ architecture. Like various other components of the system, the intranet, and thus the processing elements of the intranet, is typically indirectly coupled to the Internet, and thus the terminal, via a GTW 18. Similarly, although not shown, each network or portion of a network included within the intranet can be interconnected with one another via a GTW.

More particularly, as shown in FIG. 1, processing elements such as media servers 36 and/or media players 38 can be directly coupled to the terminal (operating in an ad hoc mode) or indirectly coupled to the terminal through a network such as the intranet 34 via the AP 30. The media servers and media players can be coupled to the intranet in any of a number of different manners. For example, one or more media servers and/or media players can be directly coupled to the intranet. Additionally or alternatively, one or more of the media servers and/or media players can be indirectly coupled to the intranet via an AP, the AP being the same as or different from the AP coupling the terminal to the intranet.

The media servers 36 can comprise any of a number of different devices capable of providing content acquisition, recording, storage and/or sourcing capabilities. For example, in accordance with the DLNA architecture, the media servers can comprise set-top boxes (STBs), personal video recorders (PVRs), PCs, stereo and home theaters that include non-volatile memory (e.g., music servers), broadcast tuners, video and imaging capture devices (e.g., cameras, camcorders, etc.), and/or multimedia mobile terminals (e.g., mobile telephones, portable digital assistants (PDAs), pagers, laptop computers, etc.). The media players 38 can likewise comprise any of a number of different devices capable of providing content playback and rendering capabilities, and may be co-located within one or more devices also including a media server. For example, in accordance with the DLNA architecture, the media players can comprise television monitors, stereo and home theaters, printers, multimedia mobile terminals, wireless monitors and/or game consoles.

Irrespective of the specific device, one or more media servers 36 are capable of storing content capable of being rendered by one or more media players 38, and/or downloaded by a terminal 10 via the intranet and the AP 30. Similarly, one or more media servers are capable of downloading content from a terminal via the intranet and the AP. In this regard, the content can comprise any of a number of different types of content such as, for example, textual, audio, video and/or other types of multimedia content, software packages, applications, routines and/or other types of executable content.

Reference is now made to FIG. 2, which illustrates a block diagram of an entity capable of operating as one or more entities of the system shown in FIG. 1 including, for example, a terminal 10, GTW 18, origin server 22, user processor 32, media server 36 and/or media player 38, is shown in accordance with one exemplary embodiment of the present invention. Although shown as separate entities, in some exemplary embodiments, one or more entities may support one or more of the terminal, GTW, origin server, user processor and/or media server, logically separated but co-located within the entit(ies). For example, a single entity (e.g., set top box) may or other entity may support a logically separate, but co-located, media server, media player and/or GTW.

As shown, the entity capable of operating as a terminal 10, GTW 18, origin server 22, user processor 32, media server 36 and/or media player 38 includes various means for performing one or more functions in accordance with exemplary embodiments of the present invention, including those more particularly shown and described herein. It should be understood, however, that one or more of the entities may include alternative means for performing one or more like functions, without departing from the spirit and scope of the present invention. More particularly, for example, as shown in FIG. 2, the entity can include a processor 40 connected to a memory 42. The memory can comprise volatile and/or non-volatile memory, and typically stores content, data or the like. For example, the memory typically stores content transmitted from, and/or received by, the entity. Also for example, the memory typically stores client applications, instructions or the like for the processor to perform steps associated with operation of the entity in accordance with exemplary embodiments of the present invention.

As described herein, the client application(s) may each comprise software operated by the respective entities. It should be understood, however, that any one or more of the client applications described herein can alternatively comprise firmware or hardware, without departing from the spirit and scope of the present invention. Generally, then, the terminal 10, GTW 18, origin server 22, user processor 32, media server 36 and/or media player 38 can include one or more logic elements for performing various functions of one or more client application(s). As will be appreciated, the logic elements can be embodied in any of a number of different manners. In this regard, the logic elements performing the functions of one or more client applications can be embodied in an integrated circuit assembly including one or more integrated circuits integral or otherwise in communication with a respective network entity (i.e., terminal, GTW, origin server, user processor, media server, media player, etc.) or more particularly, for example, a processor 40 of the respective network entity. The design of integrated circuits is by and large a highly automated process. In this regard, complex and powerful software tools are available for converting a logic level design into a semiconductor circuit design ready to be etched and formed on a semiconductor substrate. These software tools automatically route conductors and locate components on a semiconductor chip using well established rules of design as well as huge libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

In addition to the memory 42, the processor 40 can also be connected to at least one interface or other means for displaying, transmitting and/or receiving data, content or the like. In this regard, the interface(s) can include at least one communication interface 44 or other means for transmitting and/or receiving data, content or the like, as well as at least one user interface that can include a display 46 and/or a user input interface 48. The user input interface, in turn, can comprise any of a number of devices allowing the entity to receive data from a user, such as a keypad, a touch display, a joystick or other input device.

Reference is now drawn to FIG. 3, which illustrates a block diagram of a mobile terminal 10 in accordance with one exemplary embodiment of the present invention. The terminal includes various means for performing one or more functions in accordance with exemplary embodiments of the present invention, including those more particularly shown and described herein. It should be understood, however, that the terminal may include alternative means for performing one or more like functions, without departing from the spirit and scope of the present invention.

More particularly, for example, as shown in FIG. 3, in addition to the antenna 12, the mobile terminal can include a transmitter 50, receiver 52, and controller 54 or other processor that provides signals to and receives signals from the transmitter and receiver, respectively. These signals include signaling information in accordance with the air interface standard of the applicable cellular system, and also user speech and/or user generated data. In this regard, the mobile terminal can be capable of operating with one or more air interface standards, communication protocols, modulation types, and access types. More particularly, the mobile terminal can be capable of operating in accordance with any of a number of 1G, 2G, 2.5G and/or 3G communication techniques or the like.

It is understood that the controller 54 includes the circuitry required for implementing the audio and logic functions of the mobile terminal. For example, the controller may be comprised of a digital signal processor device, a microprocessor device, and various analog-to-digital converters, digital-to-analog converters, and/or other support circuits. The control and signal processing functions of the mobile terminal are allocated between these devices according to their respective capabilities. The controller can additionally include an internal voice coder (VC) 54a, and may include an internal data modem (DM) 54b. Further, the controller may include the functionally to operate one or more software programs, which may be stored in memory (described below). For example, the controller may be capable of operating a connectivity program, such as a conventional Web browser. The connectivity program may then allow the mobile terminal to transmit and receive Web content, such as according to the Hypertext Transfer Protocol (HTTP), the Wireless Application Protocol (WAP), and/or the WebDAV (World Wide Web Distributed Authoring and Versioning) protocol (over HTTP), for example.

The mobile terminal also comprises a user interface including a conventional earphone or speaker 56, a ringer 58, a microphone 60, a display 62, and a user input interface, all of which are coupled to the controller 54. The user input interface, which allows the mobile terminal to receive data, can comprise any of a number of devices allowing the mobile terminal to receive data, such as a keypad 64, a touch display (not shown) or other input device. In exemplary embodiments including a keypad, the keypad includes the conventional numeric (0-9) and related keys (#, *), and other keys used for operating the mobile terminal. Although not shown, the mobile terminal can include a battery, such as a vibrating battery pack, for powering the various circuits that are required to operate the mobile terminal, as well as optionally providing mechanical vibration as a detectable output.

As indicated above, the mobile terminal 10 can also include one or more means for sharing and/or obtaining data, such as from AP(s) 30, user processor(s) 32, media server(s) 36, media player(s) 38 or the like. As shown in FIG. 3, the mobile terminal can include a RF module 66 capable of transmitting and/or receiving content from one or more media servers and/or media players directly or via the intranet 34 and AP(s). In addition or in the alternative, the mobile terminal can include other modules, such as, for example an, a Bluetooth (BT) module 68 and/or a WLAN module 70 capable of transmitting and/or receiving data in accordance with Bluetooth and/or WLAN techniques, respectively.

The mobile terminal 10 can further include memory, such as a subscriber identity module (SIM) 72, a removable user identity module (R-UIM) or the like, which typically stores information elements related to a mobile subscriber. In addition to the SIM, the mobile terminal can include other removable and/or fixed memory. In this regard, the mobile terminal can include volatile memory 74, such as volatile random access memory (RAM) including a cache area for the temporary storage of data. The mobile terminal can also include other non-volatile memory 76, which can be embedded and/or may be removable. The non-volatile memory can additionally or alternatively comprise an EEPROM, flash memory or the like. The memories can store any of a number of pieces of information, and data, used by the mobile terminal to implement the functions of the mobile terminal. The memories can also store one or more applications capable of operating on the mobile terminal.

As explained in the background section, whereas conventional plug-and-play (PnP) security techniques are adequate, it is generally desirable to improve upon existing techniques. Exemplary embodiments of the present invention therefore provide an improved user entity, PnP entity, method and computer program product for configuring security in a PnP architecture. Exemplary embodiments of the present invention may be described herein with respect to the UPnP™ architecture. It should be understood, however, that exemplary embodiments of the present invention may be equally applicable to other plug-and-play architectures.

In accordance with exemplary embodiments of the present invention, the device description document of a device in a PnP architecture may include a security address pointing to a security manager. Employing the security address, then, a control point in the PnP architecture can access the security manager to configure application-layer security of the PnP device. In this regard, although the control point may be triggered to configure the application-layer security via the device description document of the PnP device, the control point may configure the application-layer security without regard to any security service (e.g., PnP Device Security Service) that may otherwise be provided by the PnP architecture.

Further, and more particularly for those devices in the PnP architecture that do provide a security service, exemplary embodiments of the present invention may bootstrap establishing link-layer security of the device with configuring application-layer security of the device. In this regard, establishing link-layer security of the device may include acquisition of various parameters, including various cryptographic keys. These, parameters, then, may also be used by the device during configuration of the application-layer security of the device, such as by authenticating an owner of the device. Thus, configuring application-layer security in these instances may occur without the overhead and time required to separately exchange parameters for use during configuration.

Reference is now drawn to FIGS. 4, 5 and 6, which illustrate a functional block diagram and control flow diagrams of a user entity 80 at least partially operating under control of a user 82 to configure application-layer security of a PnP entity 84. As shown, the application-layer security of the PnP entity can be configured to permit another entity 86 to access a resource of the PnP entity. Additionally or alternatively, the application-layer security of the PnP entity can be configured in connection with configuring link-layer security of the PnP entity accessing one or more networks 88 (e.g., Internet 20, intranet 34, etc.). To effectuate the security configuration and resource access of the PnP entity, the user entity and other entity each operate a control point 90, such as a software application stored in memory of the respective user/other entity, capable of functioning as clients in a client-server arrangement. In turn, the PnP entity operates a PnP device 92, such as a software application stored in memory of the PnP entity, capable of functioning as the server in the client-server arrangement. During operation, the PnP device may further communicate with a security manager 94 (e.g., software application stored in memory of the PnP entity) capable of providing an access control list (ACL) framework for configuring application-layer security of the PnP entity, or more particularly the PnP device of the PnP entity, such as in accordance with HTTP (Hypertext Transfer Protocol), XCAP (XML Control Access Protocol), WebDAV (World Wide Web Distributed Authoring and Versioning) or the like. Thus, as explained below with reference to FIG. 5, although a control point may be triggered to configure application-layer security of the PnP device in accordance with a PnP architecture (via a device description document of the PnP entity), the control point may configure the application-layer security without regard to any PnP Device Security Service that may otherwise be provided by the PnP architecture.

As will be appreciated, the user entity 80, PnP entity 84 and other entity 86 can comprise any of a number of different network entities that are capable of performing the functions described herein. For example, any one or more of the user entity, PnP entity and other entity can comprise a terminal 10, origin server 22, user processor 32, media server 36, media player 38 within and/or external a intranet 34. Also, as described herein, the various entities can communicate with one another in any of a number of different manners, including at least partially in accordance with the UPnP™ architecture or another PnP architecture. It should also be understood that although exemplary embodiments of the present invention describe configuring application-layer security of a PnP device, other application-layer security, such as HTTP SSL/TLS) may also be applied in addition to that configured as described herein.

In addition, whereas the control points 90, PnP device 92 and security manager 94 can each comprise software operated by the respective entities, one or more of the control points, PnP device and security manager can alternatively comprise firmware or hardware. In addition, it should also be understood that one or more of the control points, PnP device and security manager can additionally or alternatively be operated from a network entity other than the entity shown and principally described herein as operating the respective applications. For example, yet another network entity can operate a security manager in addition to, or in lieu of, the PnP entity, and at least partially control operation of the PnP entity based on the operation thereof.

Further, although shown and described as separate entities, one or more functions of the user 82, its user entity 80 and/or control point 90 may be performed by one or more of the other of the user, user entity and/or control point. Thus, for example, although a function may be described as being performed by the user, that function may equally be performed by one or both of the user entity and control point. Similarly, one or more functions of the PnP device 92 and security manager 94 may be performed by the other of the PnP device and security manager. For example, although a function may be described as being performed by the security manager, that function may equally be performed by the PnP device.

Referring now to FIG. 5, a method of configuring security of a PnP entity 84, or more particularly the PnP device 92 of a PnP entity, includes the control point 90 of the user entity 80 receiving a device description document of the PnP device of the PnP entity. In this regard, in accordance with the UPnP™ architecture, after the UPNP device becomes addressable (e.g., allocated an IP address), the PnP device multicasts a device announcement to advertise its root/embedded devices and services and for the control points to discover the PnP device. The control point of the user entity, discovering the PnP device via the device announcement, can then download (request and receive) the device description document of the PnP device. In this regard, the device description document can comprise an XML document configured in accordance with the UPnP™ standard and including information regarding the PnP device, such as vendor-specific, manufacturer information including the model name and number, serial number, manufacturer name, URLs (Uniform Resource Locators) to vendor-specific Web sites, and the like. The description also includes a list of any embedded devices or services, as well as URLs for control, eventing, and presentation.

In accordance with exemplary embodiments of the present invention, in addition to the aforementioned information, the device description document received by the control point 90 of the user entity 80 includes an address (e.g., security (SEC) URL) pointing to the security manager 94 of the PnP entity 84. Upon receiving the device description document including the security manager address, the user 82 (via its user entity) can attempt to access or sign-in to the security manager based upon its address. In this regard, upon initial contact with the security manager, the security manager may require the user to authenticate itself to access the security manager, such as by providing an appropriate user ID (identifier) and password or PIN (personal identification number). Then, provided the security manager successfully authenticates the user, security manager can configure the user entity as the owner of the PnP device with full access rights, such as in an ACL document based upon a unique ID (e.g., MAC (Media Access Control) address).

Also after successfully authenticating the user 82, the control point 90 of the user entity 80 can communicate with the security manager 94 to further configure application-layer security of the PnP device 92. In this regard, the security manager can request that the user identify one or more other users authorized to access a service of the PnP device, those other user(s) being identified for inclusion in an ACL of the PnP device 84. In this regard, the security manager can send, to the control point of the user entity, a page document including portions for receiving information identifying those other user(s) authorized to access the PnP device, such as by receiving IDs associated with those other user(s) (e.g., "Jane," "Pep," "All," "Guest," "Anonymous," etc.). In addition to identification of authorized user(s), the security manager can also request specification of a level of access (e.g., All, Read, Write, Read/Write, etc.) being granted the authorized user(s), and may further specify a period of time for which one or more identified user(s) are authorized to access the PnP device. Further, the security manager may request passwords/PINs associated with the authorized user(s) that may be thereafter used to authenticate the respective user(s) to the security manager before granting access to the PnP device. Alternatively, upon receiving the identities of the authorized user(s), the security manager may itself generate or otherwise receive associated passwords/PINs.

In response to receiving the request for authorized user(s) from the security manager 94, the user 82 can send the requested ACL information (e.g., IDs, passwords/PINs, levels of access, validity time, etc.) to the security manager. When the security manager requests the information via a page document, for example, the control point 90 of the user entity 80 can display the page document to the user, which can thereafter enter the requested information into those portions of the page document for receiving such information. The control point can then send the page document, including the requested information, back to the security manager for posting therewith. Thus, in response to receiving the requested information or page document including the requested information, the security manager can post the information with the PnP device, such as in the ACL document, to thereby create an ACL for the PnP device 92.

Before or after the ACL is created for the PnP device 92, one or more pieces of the ACL information can be sent to the other authorized user(s) included therein. For example, after sending the requested ACL information to the security manager 94, the user 82 can send the other authorized user(s) or their user entit(ies) (e.g., other entity 86) with the IDs and passwords/PINs associated with the respective user(s) in the ACL, which may be necessary for the security manager to authenticate the respective user(s). The ACL information can be sent to the other authorized user(s) or their user entit(ies) in any of a number of different manners, such as by sending the ACL information via the user entity 80 and an out-of-band channel, or manually inserting the ACL information in the user entit(ies) of those other authorized user(s).

After the ACL is created and the ACL information is sent to another authorized user its other entity 86, the other entity, or more particularly the control point 90 of the other entity, may attempt to access a service of the PnP device 92 of the PnP entity 84. In response to a service request from the control point of the other entity, the PnP device can initiate an authentication process whereby the other user may be authenticated to access the requested service. Thus, the PnP device can check the request for a signature or other means by which the PnP device can authenticate the other entity. If the request does not include a signature from which the other entity can be authenticated, the PnP device can return to the other entity an error message (e.g., 401 unauthorized message) notifying the control point of the other entity of the authentication failure.

In addition to notifying the control point 90 of the other entity 86 of the authentication failure, the error message can include the address (e.g., SEC URL) pointing to the security manager 94 of the PnP entity 84. Alternatively, the error message may automatically redirect the control point of the other entity to the security manager based upon its address. After receiving the message including the security manager address, the other user of the other entity (via its other entity) can access the security manager based upon its address, and attempt to authenticate itself to the security manager. In this regard, upon initial contact with the security manager, the security manager may require the other user to authenticate itself to access the requested service of the PnP device 92, such as by providing an appropriate user ID and password/PIN (PWD) associated with the other user in the ACL. Then, provided the security manager successfully authenticates the other user, the security manager can return to the control point of the other entity a success message (e.g., 200 OK message) notifying the respective control point of the authentication success. The control point of the other entity may then access the requested service of the PnP device.

After being authenticated, the control point 90 of the other entity 86 can access the requested service of the PnP device 92 in any of a number of different manners. For example, the security manager can notify the PnP device of the successful authentication, to which the PnP device may respond by sending the previously requested service to the respective control point. In such instances, the requested service may be sent to the respective control point in addition to or in lieu of the success message notifying the control point of the successful authentication. In another example, as shown in FIG. 5, after successfully authenticating the other user, security manager can update the ACL to associate a unique ID (e.g., MAC address) of the other entity with the respective other user; and can generate an authentication signature, which may also be associated with the respective other user. The security manager can send the authentication signature to the control point of the other entity, separate from or within the success message. Then, the control point can again request the service of the PnP device, including the authentication signature in the service request such as in an authentication header or as a cookie. Again, in response to a service request from the control point of the other entity, the PnP device can initiate an authentication process whereby the other user can be authenticated to access the requested service. Thus, the PnP device can check the request for an appropriate authentication signature by which the PnP device can authenticate the other entity. Since the request does include an appropriate authentication signature, the other user is authenticated, and the PnP device can send the requested service to the respective control point.

As will be appreciated by those skilled in the art, not only is application-layer security important for entities of the system, and generally the overall system, but link-layer security is also important for the system and the entities that communicate across one or more networks within the system. Currently, a number of different protocols have been developed that specify link-layer security, including the Wireless Equivalent Privacy (WEP), WiFi Protected Access (WPA), IEEE 802.11i, and the like. For an entity, establishing a security association between two entities may include the exchange of parameters including one or more cryptographic keys needed for securing a connection, and the identity of the respective entity (e.g., hostname, network address, etc.). For example, establishing a security association between a user entity or other entity and a network, or more particularly an access entity (e.g., AP 30) of the network via which the user/other entity accesses that network, may include the exchange of user parameters and network parameters. In this regard, in accordance with WEP, the user parameters can include the MAC address of the user/other entity and any appropriate cryptographic keys associate with the user/other entity. The network parameters, on the other hand, can include a network name, Service Set Identifier (SSID), password/PIN of the access entity and any appropriate cryptographic keys associated with the access entity. The SSID can function as a password when an entity attempts to connect to the access entity, and can comprise a 32-character unique identifier attached to the header of packets sent over the network.

In a further aspect of exemplary embodiments of the present invention, the PnP device 92 of the PnP entity 84 may further establish link-layer security with one or more networks 88 (e.g., Internet 20, intranet 34) within and/or across which the PnP device communicates. To reduce the overhead required to establish or otherwise configure both application-layer and link-layer security in the PnP device, however, configuring application-layer security for the PnP entity may be bootstrapped to establishment of link-layer security in the PnP entity. In this regard, one or more network parameters received by a user entity 80 during establishment of link layer security of the user entity with one or more network(s), or more particularly with one or more access entities (e.g., AP 30), can also be sent to the PnP entity to enable the PnP entity to establish link-layer security with those network(s). In this regard, the user entity may function as a registrar for one or more devices, such as the PnP entity, desiring access to the network via an access entity, such as in a manner similar to that defined by WiFi and/or WiFi-based standards. In addition to enabling the PnP entity to establish link-layer security, however, the PnP device 92 can further employ one or more of those network parameters during configuration of application-layer security of the PnP device, such as to establishment ownership of the PnP device in the user entity, particularly when the PnP device operates in accordance with a security service such as the UPnP™ Device Security Service.

In accordance with this further aspect of exemplary embodiments of the present invention, the user entity 80 may have a pre-established security association with the network 88. Accordingly, the user entity may also possess the network parameters (e.g., network name, SSID, password/PIN, cryptographic keys) by which a portion of the security association is defined. As shown in FIG. 6, then, this aspect of exemplary embodiments of the present invention includes adding the PnP entity 84, or more particularly the PnP device 92 of the PnP entity, to the network 88. To add the PnP device to the network, the user 82 can instruct the user entity 80, or more particularly the control point 90 of the user entity, to send to the PnP device the network parameters that may be necessary to connect to the network. The PnP device can then send one or more of those network parameters (along with its identity information—e.g., MAC address) to an access entity (e.g., AP 30), thereby connecting or otherwise binding itself to the network, or more particularly the access entity of the network. The PnP device may connect to the access entity without exchanging its own user parameters, and thus without a security association with the network. Thereafter, the PnP device can generate the appropriate user parameters and send those parameters to the access entity to establish a security association with the access entity, and thus the network.

After connecting to the access entity of the network 88, the PnP device 92 can become addressable (e.g., allocated an IP address) within the network, and begin multicasting a device announcement to advertise its root/embedded devices and services and for the control points to discover the PnP device. These services may include a security service (e.g., UPnP™ Device Security Service). The control point 90 of the user entity 80, discovering the PnP device via the device announcement, can then display the identity of the new PnP device to the user 82, which can then direct the user entity in configuring application-layer security of the PnP device. In this regard, if in accordance with the UPnP™ Device Security Service, the control point of the user entity may also function as a Security Console.

As further shown in FIG. 6, and in accordance with the security service provided by the PnP device 92, configuring application-layer security can include the control point 90 of the user entity 80 requesting, and the user 82 providing, a password/PIN of the PnP device 92. The control point of the user entity can then initiate a take-ownership action with respect to the PnP device to configure the user entity as the owner of the PnP device with full access rights. In accordance with a number of convention security services, including the UPnP™ Device Security Service, such a take-ownership action requires encrypting the password/PIN in a request signed by the control point. In this manner, the PnP device can authenticate the identity of the user entity as the owner of the device. In accordance with exemplary embodiments of the present invention, however, the network parameters previously sent by the control point of the user entity to the PnP device to enable the PnP device to establish link-layer security may also be used by the PnP device to authenticate the user entity. Thus, the control point can initiate the take-ownership action with respect to the PnP device at least without signing the request, and if so desired, without encryption of the password/PIN.

The take-ownership action, then, can include the control point 90 of the user entity 80 sending an ownership request, including the password/PIN, to the PnP device 92. For example, the control point can send an ownership request via the network 88 over the secure link between the user entity and the network, and the now-established secure link between the network and the PnP entity (the secure links being denoted by the respective security associations). Upon receipt of the request including the password/PIN, the PnP device can authenticate the user entity, or control point of the user entity, based upon the password/PIN and the network parameters previously received by the PnP device. Provided the PnP device successfully authenticates the user entity, and provided the PnP device verifies the password/PIN, the PnP device can configure the user entity as the owner of the PnP device with full access rights, such as in an ACL document based upon a unique ID (e.g., MAC (Media Access Control) address).

After configuring ownership of the PnP device 92 of the PnP entity 84, the control point 90 of the user entity 80 (e.g., operating as a Security Console) can configure authorization of one or more other users, or more particularly the control points of one or more other users, to access the PnP device 92, such as in accordance with the security service of the PnP device. In response to receiving the ACL information (e.g., IDs, passwords/PINs, levels of access, validity time, etc.), the security service of the PnP device 92 can configure the ACL of the PnP device to further include the ACL information. Similar to the aspect shown in FIG. 5, the control point can send, to the security service of the PnP device (e.g., securely via network 88), information identifying those other control point(s) authorized to access the PnP device, such as by sending IDs associated with those other control points(s) (e.g., "control pt 1," "control pt 2," etc.). In addition, the ACL information sent to the security service can include specification of a level of access (e.g., All, Read, Write, Read/Write, etc.) being granted the authorized control point(s), and may further specify a period of time for which one or more identified control point(s) are authorized to access the PnP device. Further, the ACL information can include passwords/PINs associated with the authorized control point(s), although one or more of these passwords/PINs may alternatively be generated by the PnP device itself.

Similar to before, before or after the ACL is created for the PnP device 92, one or more pieces of the ACL information can be provided to the other authorized control point(s) 90. For example, after sending the requested ACL information to the PnP device, the control point 90 of the user entity 80 can provide the other authorized control point(s) of other other entit(ies) 86 with the IDs and passwords/PINs associated with the respective control point(s) in the ACL, which may be necessary for the security manager to authenticate the respective control point(s). The ACL information can be provided to the other authorized control point(s) in any of a number of different manners, such as by sending the ACL information via an out-of-band channel, or manually inserting the ACL information in the other entit(ies) within which the respective control point(s) operate. The other control point(s) may then attempt to access, and if successfully authenticated access, a service of the PnP device 92 of the PnP entity 84, such as in the same manner explained above with reference to FIG. 5.

According to one exemplary aspect of the present invention, the functions performed by one or more of the entities of the system, such as the user entity 80, PnP entity 84 and/or other entity 86, may be performed by various means, such as hardware and/or firmware, including those described above, alone and/or under control of a computer program product (e.g., control points 90, PnP device 92, security manager 94, etc.). The computer program product for performing one or more functions of exemplary embodiments of the present invention includes a computer-readable storage medium, such as the non-volatile storage medium, and software including computer-readable program code portions, such as a series of computer instructions, embodied in the computer-readable storage medium.

In this regard, FIGS. 5a and 5b are control flow diagrams of methods, systems and program products according to the exemplary embodiments of the present invention. It will be understood that each block or step of the control flow diagrams, and combinations of blocs or steps in the control flow diagrams, can be implemented by various means, such as hardware, firmware, and/or software including one or more computer program instructions. As will be appreciated, any such computer program instructions may be loaded onto a computer or other programmable apparatus (i.e., hardware) to produce a machine, such that the instructions which execute on the computer or other programmable apparatus create means for implementing the functions specified in the block(s) or step(s) of the control flow diagrams. These computer program instructions may also be stored in a computer-readable memory that can direct a computer or other programmable apparatus to function in a particular manner, such that the instructions stored in the computer-readable memory produce an article of manufacture including instruction means which implement the function specified in the block(s) or step(s) of the control flow diagrams. The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the block(s) or step(s) of the control flow diagrams.

Accordingly, blocks or steps of the control flow diagrams support combinations of means for performing the specified functions, combinations of steps for performing the specified functions and program instruction means for performing the specified functions. It will also be understood that one or more blocks or steps of the control flow diagrams, and combinations of blocks or steps in the control flow diagrams, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising:
   a processor; and
   a memory including computer program code, the memory and computer program code configured to, with the processor, cause the apparatus to at least:
   receive a device description document from a plug-and-play device of a plug-and-play apparatus, the device description document including an address pointing to a security manager of the plug-and-play apparatus;
   access the security manager based upon the address, the security manager being accessed for the security manager to authenticate the apparatus; and when authenticated,
   direct communication with the security manager to configure application-layer security of the plug-and-play device, wherein configuring the application-layer security includes creating an access control list document for restricting access to a service of the plug-and-play device.

2. An apparatus according to claim 1, wherein being configured to cause the apparatus to receive a device description document includes being configured to cause the apparatus to receive a device description document configured in accordance with a plug-and-play standard.

3. An apparatus according to claim 1, wherein being configured to cause the apparatus to receive a device description document includes being configured to cause the apparatus to download a device description document in response to a device announcement from the plug-and-play device.

4. An apparatus according to claim 1, wherein being configured to cause the apparatus to direct communication with the security manager includes being configured to cause the apparatus to:
   receive a page document from the security manager;
   enter information into the page document, the information identifying at least one user authorized to access a service of the plug-and-play device; and
   prepare the page document including the entered information for transmission to the security manager for the security manager to post the entered information in the access control list document.

5. An apparatus according to claim 4, wherein the page document received from the security manager is configured in accordance with a non-plug-and-play standard.

6. An apparatus comprising:
   a processor; and
   a memory including computer program code, the memory and computer program code configured to, with the processor, cause the apparatus to at least:
   prepare network parameters for transmission to a plug-and-play device from the apparatus, wherein the apparatus has a link-layer security association with a network, the security association being at least partially defined by the network parameters, wherein being configured to cause the apparatus to prepare network parameters includes being configured to cause the apparatus to prepare network parameters for transmission for the plug-and-play device to establish link-layer security with the network, wherein the plug-and-play device establishing link-layer security includes the plug-and-play device establishing a security association of the plug-and-play device with the network, establishing a security association including preparing the received network parameters for transmission to the network;

prepare a request for transmission from the apparatus to the plug-and-play device to effectuate a take-ownership action of the apparatus;

wherein being configured to cause the apparatus to prepare a request includes being configured to cause the apparatus to prepare a request for transmission such that the plug-and-play device authenticates the apparatus based upon the request and the received network parameters; and when authenticated, direct communication with the plug-and-play device to configure application-layer security of the plug-and-play device, configuring the application-layer security including creating an access control list document for restricting access to a service of the plug-and-play device.

7. An apparatus according to claim 6, wherein the security association of the apparatus with the network denotes a secure link between the apparatus and the network, wherein the security association of the plug-and-play device with the network denotes a secure link between the plug-and-play device and the network, and wherein being configured to cause the apparatus to prepare a request includes being configured to cause the apparatus to prepare a request for transmission across the secure link between the apparatus and the network, and the secure link between the network and the plug-and-play device.

8. An apparatus according to claim 6, wherein being configured to cause the apparatus to prepare a request includes being configured to cause the apparatus to prepare a request including a password or personal identification number for transmission, the request being prepared for transmission without a signature of the apparatus, and without encryption of the included password or personal identification number.

9. An apparatus comprising:
a processor; and
a memory including computer program code, the memory and computer program code configured to, with the processor, cause the apparatus to at least:
prepare a device description document for transmission from a plug-and-play device of the apparatus, wherein the device description document includes an address pointing to a security manager of the apparatus, and wherein the device description document is prepared for transmission to a user apparatus to enable the user apparatus to access the security manager based upon the address;
authenticate the user apparatus at the security manager; and when authenticated,
direct communication with the user apparatus to configure application-layer security of the plug-and-play device, wherein configuring the application-layer security includes creating an access control list document for restricting access to a service of the plug-and-play device.

10. An apparatus according to claim 9, wherein being configured to cause the apparatus to prepare a device description document includes being configured to cause the apparatus to prepare a device description document configured in accordance with a plug-and-play standard.

11. An apparatus according to claim 9, wherein being configured to cause the apparatus to prepare a device description document includes being configured to cause the apparatus to prepare a device description document for transmission after multicasting a device announcement to at least one user apparatus, and wherein the device description document is prepared for transmission in response to a request from the user apparatus, the request being prepared for transmission from the user apparatus in response to the device announcement.

12. An apparatus according to claim 9, wherein being configured to cause the apparatus to direct communication with the user apparatus includes being configured to cause the apparatus to:
prepare a page document for transmission to the user apparatus for the user apparatus to receive information into the page document, the information identifying at least one user authorized to access a service of the plug-and-play device;
receive the page document including the entered information at the security manager; and
post the entered information in the access control list document.

13. An apparatus according to claim 12, wherein the page document prepared for transmission from the security manager is configured in accordance with a non-plug-and-play standard.

14. An apparatus comprising:
a processor; and
a memory including computer program code, the memory and computer program code configured to, with the processor cause the apparatus to at least:
receive network parameters at a plug-and-play device from a user apparatus, wherein the user apparatus has a link-layer security association with a network, the security association being at least partially defined by the network parameters;
establish link-layer security of the plug-and-play device with the network, wherein being configured to cause the apparatus to establish link-layer security includes being configured to cause the plug-and-play device to establish a security association of the plug-and-play device with the network, being configured to cause the plug-and-play device to establish a security association including being configured to cause the plug-and-play device to prepare the received network parameters for transmission to the network;
receive a request at the plug-and-play device to effectuate a take-ownership action of the user apparatus;
authenticate the user apparatus at the plug-and-play device based upon the request and the received network parameters; and when authenticated,
direct communication with the user apparatus to configure application-layer security of the plug-and-play device, configuring the application-layer security including creating an access control list document for restricting access to a service of the plug-and-play device.

15. An apparatus according to claim 14, wherein the security association of the user apparatus with the network denotes a secure link between the user apparatus and the network, wherein the security association of the plug-and-play device with the network denotes a secure link between the plug-and-play device and the network, and wherein being configured to cause the apparatus to receive a request includes being configured to cause the apparatus to receive a request from the secure link between the user apparatus and the network, and the secure link between the network and the plug-and-play device.

16. An apparatus according to claim 14, wherein being configured to cause the apparatus to receive a request includes being configured to cause the apparatus to receive a request including a password or personal identification number, the request being received without a signature of the user apparatus, and without encryption of the included password or personal identification number.

17. A method comprising performing or causing performance of at least the following:

receiving, at a user apparatus, a device description document from a plug-and-play device of a plug-and-play apparatus, the device description document including an address pointing to a security manager of the plug-and-play apparatus;

accessing the security manager based upon the address, the security manager being accessed for the user apparatus to authenticate to the security manager; and when authenticated, directing communication with the security manager to configure application-layer security of the plug-and-play device, wherein configuring the application-layer security includes creating an access control list document for restricting access to a service of the plug-and-play device.

18. A method according to claim 17, wherein receiving a device description document comprises receiving a device description document configured in accordance with a plug-and-play standard.

19. A method according to claim 17, wherein receiving a device description document comprises downloading a device description document in response to a device announcement from the plug-and-play device.

20. A method according to claim 17, wherein directing communication with the security manager comprises:

receiving a page document from the security manager;

entering information into the page document, the information identifying at least one user authorized to access a service of the plug-and-play device; and preparing the page document including the entered information for transmission to the security manager for the security manager to post the entered information in the access control list document.

21. A method according to claim 20, wherein the page document received from the security manager is configured in accordance with a non-plug-and-play standard.

22. A method comprising performing or causing performance of at least the following:

preparing network parameters for transmission to a plug-and-play device from a user apparatus, wherein the user apparatus has a link-layer security association with a network, the security association being at least partially defined by the network parameters, wherein preparing network parameters comprises preparing network parameters for transmission for the plug-and-play device to establish link-layer security with the network, wherein the plug-and-play device establishing link-layer security includes the plug-and-play device establishing a security association of the plug-and-play device with the network, establishing a security association including preparing the received network parameters for transmission to the network;

preparing a request for transmission from the user apparatus to the plug-and-play device to effectuate a take-ownership action of the user apparatus, wherein preparing a request comprises preparing a request for transmission such that the plug-and-play device authenticates the user apparatus based upon the request and the received network parameters; and when authenticated, directing communication with the plug-and-play device to configure application-layer security of the plug-and-play device, configuring the application-layer security including creating an access control list document for restricting access to a service of the plug-and-play device.

23. A method according to claim 22, wherein the security association of the user apparatus with the network denotes a secure link between the user apparatus and the network, wherein the security association of the plug-and-play device with the network denotes a secure link between the plug-and-play device and the network, and wherein preparing a request comprises preparing a request for transmission across the secure link between the user apparatus and the network, and the secure link between the network and the plug-and-play device.

24. A method according to claim 22, wherein preparing a request comprises preparing a request including a password or personal identification number for transmission, the request being prepared for transmission without a signature of the user apparatus, and without encryption of the included password or personal identification number.

25. A method comprising performing or causing performance of at least the following:

preparing a device description document for transmission from a plug-and-play device of a plug-and-play apparatus, wherein the device description document includes an address pointing to a security manager of the plug-and-play apparatus, and wherein the device description document is prepared for transmission to a user apparatus to enable the user apparatus to access the security manager based upon the address;

authenticating the user apparatus at the security manager; and when authenticated, directing communication with the user apparatus to configure application-layer security of the plug-and-play device at the security manager, wherein configuring the application-layer security includes creating an access control list document for restricting access to a service of the plug-and-play device.

26. A method according to claim 25, wherein preparing a device description document comprises preparing a device description document configured in accordance with a plug-and-play standard.

27. A method according to claim 25, wherein preparing a device description document comprises preparing a device description document for transmission after multicasting a device announcement from the plug-and-play device to at least one user apparatus, and wherein the device description document is prepared for transmission in response to a request from the user apparatus, the request being prepared for transmission from the user apparatus in response to the device announcement.

28. A method according to claim 25, wherein directing communication with the user apparatus comprises:

preparing a page document for transmission from the security manager for the user apparatus to receive information into the page document, the information identifying at least one user authorized to access a service of the plug-and-play device;
receiving the page document including the entered information at the security manager; and
posting the entered information in the access control list document.

29. A method according to claim 28, wherein the page document prepared for transmission from the security manager is configured in accordance with a non-plug-and-play standard.

30. A method comprising performing or causing performance of at least the following:
receiving network parameters at a plug-and-play device from a user apparatus, wherein the user apparatus has a link-layer security association with a network, the security association being at least partially defined by the network parameters;
establishing link-layer security of the plug-and-play device with the network, wherein establishing link-layer security includes establishing a security association of the plug-and-play device with the network, establishing a security association including preparing the received network parameters for transmission to the network;
receiving a request at the plug-and-play device to effectuate a take-ownership action of the user apparatus;
authenticating the user apparatus at the plug-and-play device based upon the request and the received network parameters; and when authenticated,
directing communication with the user apparatus to configure application-layer security of the plug-and-play device, configuring the application-layer security including creating an access control list document for restricting access to a service of the plug-and-play device.

31. A method according to claim 30, wherein the security association of the user apparatus with the network denotes a secure link between the user apparatus and the network, wherein the security association of the plug-and-play device with the network denotes a secure link between the plug-and-play device and the network, and
wherein receiving a request comprises receiving a request from the secure link between the user apparatus and the network, and the secure link between the network and the plug-and-play device.

32. A method according to claim 30, wherein receiving a request comprises receiving a request including a password or personal identification number, the request being received without a signature of the user apparatus, and without encryption of the included password or personal identification number.

33. A computer program product comprising at least one computer-readable storage medium having computer-readable program code portions stored therein, the computer-readable storage medium and computer-readable program code portions being configured to, with a processor, cause an apparatus to at least:
receive, at a user apparatus, a device description document from a plug-and-play device of a plug-and-play apparatus, the device description document including an address pointing to a security manager of the plug-and-play apparatus;
access the security manager based upon the address, the security manager being accessed for the user apparatus to authenticate to the security manager; and when authenticated,
direct communication with the security manager to configure application-layer security of the plug-and-play device, wherein configuring the application-layer security includes creating an access control list document for restricting access to a service of the plug-and-play device.

34. A computer program product according to claim 33, wherein being configured to cause the apparatus to receive a device description document includes being configured to cause the apparatus to receive a device description document configured in accordance with a plug-and-play standard.

35. A computer program product according to claim 33, wherein being configured to cause the apparatus to receive a device description document includes being configured to cause the apparatus to download a device description document in response to a device announcement from the plug-and-play device.

36. A computer program product according to claim 33, wherein being configured to cause the apparatus to direct communication with the security manager includes being configured to cause the apparatus to:
receive a page document from the security manager;
enter information into the page document, the information identifying at least one user authorized to access a service of the plug-and-play device; and
prepare the page document including the entered information for transmission to the security manager for the security manager to post the entered information in the access control list document.

37. A computer program product according to claim 36, wherein the page document received from the security manager is configured in accordance with a non-plug-and-play standard.

38. A computer program product comprising at least one computer-readable storage medium having computer-readable program code portions stored therein, the computer-readable storage medium and computer-readable program code portions being configured to, with a processor cause an apparatus to at least:
prepare network parameters for transmission to a plug-and-play device from a user apparatus, wherein the user apparatus has a link-layer security association with a network, the security association being at least partially defined by the network parameters,
wherein being configured to cause the apparatus to prepare network parameters includes being configured to cause the apparatus to prepare network parameters for transmission for the plug-and-play device to establish link-layer security with the network, wherein the plug-and-play device establishing link-layer security includes the plug-and-play device establishing a security association of the plug-and-play device with the network, establishing a security association including preparing the received network parameters for transmission to the network;
prepare a request for transmission from the user apparatus to the plug-and-play device to effectuate a take-ownership action of the user apparatus,
wherein being configured to cause the apparatus to prepare a request includes being configured to cause the apparatus to prepare a request for transmission such that the plug-and-play device authenticates the user apparatus based upon the request and the received network parameters; and when authenticated,
direct communication with the plug-and-play device to configure application-layer security of the plug-and-play device, configuring the application-layer security including creating an access control list document for restricting access to a service of the plug-and-play device.

39. A computer program product according to claim 38, wherein the security association of the user apparatus with the network denotes a secure link between the user apparatus and the network, wherein the security association of the plug-and-play device with the network denotes a secure link between the plug-and-play device and the network, and wherein being configured to cause the apparatus to prepare a request includes being configured to cause the apparatus to prepare a request for transmission across the secure link between the user apparatus and the network, and the secure link between the network and the plug-and-play device.

40. A computer program product according to claim 38, wherein being configured to cause the apparatus to prepare a request includes being configured to cause the apparatus to prepare a request including a password or personal identification number for transmission, the request being prepared for transmission without a signature of the user apparatus, and without encryption of the included password or personal identification number.

41. A computer program product comprising at least one computer-readable storage medium having computer-readable program code portions stored therein, the computer-readable storage medium and computer-readable program code portions being configured to, with a processor, cause an apparatus to at least:

prepare a device description document for transmission from a plug-and-play device of a plug-and-play apparatus, wherein the device description document includes an address pointing to a security manager of the plug-and-play apparatus, and wherein the device description document is prepared for transmission to a user apparatus to enable the user apparatus to access the security manager based upon the address;

authenticate the user apparatus at the security manager; and when authenticated, direct communication with the user apparatus to configure application-layer security of the plug-and-play device at the security manager, wherein configuring the application-layer security includes creating an access control list document for restricting access to a service of the plug-and-play device.

42. A computer program product according to claim 41, wherein being configured to cause the apparatus to prepare a device description document includes being configured to cause the apparatus to prepare a device description document configured in accordance with a plug-and-play standard.

43. A computer program product according to claim 41, wherein being configured to cause the apparatus to prepare a device description document includes being configured to cause the apparatus to prepare a device description document after multicasting a device announcement from the plug-and-play device to at least one user apparatus, and wherein the device description document is prepared for transmission in response to a request from the user apparatus, the request being prepared for transmission from the user apparatus in response to the device announcement.

44. A computer program product according to claim 41, wherein being configured to cause the apparatus to direct communication with the user apparatus includes being configured to cause the apparatus to:

prepare a page document for transmission from the security manager for the user apparatus to receive information into the page document, the information identifying at least one user authorized to access a service of the plug-and-play device;

receive the page document including the entered information at the security manager; and post the entered information in the access control list document.

45. A computer program product according to claim 44, wherein the page document prepared for transmission from the security manager is configured in accordance with a non-plug-and-play standard.

46. A computer program product comprising at least one computer-readable storage medium having computer-readable program code portions stored therein, the computer-readable storage medium and computer-readable program code portions being configured to, with a processor, cause an apparatus to at least:

receive network parameters at a plug-and-play device from a user apparatus, wherein the user apparatus has a link-layer security association with a network, the security association being at least partially defined by the network parameters;

establish link-layer security of the plug-and-play device with the network, wherein establishing link-layer security includes establishing a security association of the plug-and-play device with the network, establishing a security association including preparing the received network parameters for transmission to the network;

receive a request at the plug-and-play device to effectuate a take-ownership action of the user apparatus;

authenticate the user apparatus at the plug-and-play device based upon the request and the received network parameters; and when authenticated, direct communication with the user apparatus to configure application-layer security of the plug-and-play device, configuring the application-layer security including creating an access control list document for restricting access to a service of the plug-and-play device.

47. A computer program product according to claim 46, wherein the security association of the user apparatus with the network denotes a secure link between the user apparatus and the network, wherein the security association of the plug-and-play device with the network denotes a secure link between the plug-and-play device and the network, and wherein being configured to cause the apparatus to receive a request includes being configured to cause the apparatus to receive a request from the secure link between the user apparatus and the network, and the secure link between the network and the plug-and-play device.

48. A computer program product according to claim 46, wherein being configured to cause the apparatus to receive a request includes being configured to cause the apparatus to receive a request including a password or personal identification number, the request being received without a signature of the user apparatus, and without encryption of the included password or personal identification number.

* * * * *